United States Patent
Eramian et al.

(10) Patent No.: US 10,943,237 B2
(45) Date of Patent: Mar. 9, 2021

(54) AUTHENTICATION DEVICE THAT ENABLES TRANSACTIONS WITH A PAYMENT INSTRUMENT

(71) Applicant: PAYPAL, INC., San Jose, CA (US)

(72) Inventors: David Edward Eramian, Mountain View, CA (US); Michael Voege, Santa Clara, CA (US)

(73) Assignee: PayPal, Inc., San Jose, CA (US)

( * ) Notice: Subject to any disclaimer, the term of this patent is extended or adjusted under 35 U.S.C. 154(b) by 593 days.

(21) Appl. No.: 14/587,890

(22) Filed: Dec. 31, 2014

(65) Prior Publication Data
US 2016/0189154 A1 Jun. 30, 2016

(51) Int. Cl.
*G06Q 20/40* (2012.01)

(52) U.S. Cl.
CPC ....... *G06Q 20/405* (2013.01); *G06Q 20/4014* (2013.01); *G06Q 20/4016* (2013.01)

(58) Field of Classification Search
CPC combination set(s) only.
See application file for complete search history.

(56) References Cited

U.S. PATENT DOCUMENTS

| 8,600,882 | B2 * | 12/2013 | Summerrow | G06Q 20/28 705/35 |
| 2004/0078340 | A1 | 4/2004 | Evans | |
| 2007/0250920 | A1 * | 10/2007 | Lindsay | G07F 7/1025 726/7 |
| 2007/0282740 | A1 * | 12/2007 | Wendt | G06Q 20/10 705/39 |
| 2010/0145737 | A1 * | 6/2010 | Joao | G06Q 20/10 705/4 |
| 2011/0153493 | A1 | 6/2011 | Mulakaluri et al. | |

(Continued)

OTHER PUBLICATIONS

Huberty, et al. Wearable Devices The Internet of Things Becomes Personal, Nov. 19, 2014, pertinent pp. 7-8, 66-68 (Year: 2014).*

(Continued)

*Primary Examiner* — Mohammad Z Shaikh
*Assistant Examiner* — Gregory S Cunningham, II
(74) *Attorney, Agent, or Firm* — Haynes and Boone LLP (57) ABSTRACT

Embodiments of systems and methods are provided for an authentication device that enables transactions with a payment instrument at different limitations, restrictions and/or use conditions. In an embodiment, a system comprises a receiver configured to receive, through an authentication device, authentication information associated with a user of the authentication device or with a payment instrument, wherein the payment instrument communicates with the authentication device, and the payment instrument has a first limitation that does not need pre-authorization. The system also comprises a payment instrument authorization module implemented by at least one hardware processor operatively connected to the receiver, the hardware processor(s) configured to: determine validity of the received authentication information; authorize a second limitation for the payment instrument based on the validity of the received authentication information; and communicate, to the authentication device or to a an entity device, authorization information for the payment instrument at the second limitation.

20 Claims, 5 Drawing Sheets

(56) References Cited

U.S. PATENT DOCUMENTS

| | | | |
|---|---|---|---|
| 2012/0016793 A1* | 1/2012 | Peters | G06Q 20/10 |
| | | | 705/39 |
| 2013/0036048 A1* | 2/2013 | Campos | G06Q 20/36 |
| | | | 705/41 |
| 2013/0218694 A1* | 8/2013 | Kingston | G06Q 20/405 |
| | | | 705/16 |
| 2013/0218771 A1* | 8/2013 | Jarman | G06Q 20/12 |
| | | | 705/44 |
| 2013/0246280 A1* | 9/2013 | Kirsch | G06Q 20/3825 |
| | | | 705/71 |
| 2013/0282582 A1 | 10/2013 | Pereira et al. | |
| 2014/0143150 A1* | 5/2014 | Karlov | G04G 99/006 |
| | | | 705/44 |
| 2015/0134513 A1* | 5/2015 | Olson | G06K 19/06206 |
| | | | 705/39 |
| 2015/0294303 A1* | 10/2015 | Hanson | G06K 19/0723 |
| | | | 235/379 |
| 2015/0339664 A1* | 11/2015 | Wong | H04L 9/3234 |
| | | | 705/71 |

OTHER PUBLICATIONS

Yildiz, et al. Combining Biometric ID Cards and Online Credit Card Transactions, Feb. 1, 2010, 2010 Fourth International Conference on Digital Society (pp. 20-24), entire document pertinent (Year: 2010).*

* cited by examiner

AUTHENTICATION DEVICE THAT ENABLES TRANSACTIONS WITH A PAYMENT INSTRUMENT

TECHNICAL FIELD

Embodiments of the present disclosure generally relate to user devices, and more specifically, to authentication devices that enable transactions with a payment instrument.

BACKGROUND

Transaction cards such as credit cards, debit cards and gift cards are widely used for all kinds of commerce. However, transaction cards may pose drawbacks such as potential security risks, for instance, transaction cards may be lost or stolen. Fraudulent users may easily get away with using a lost or stolen transaction card for online transactions or at a merchant's location because most merchants may not actually check for user identification or compare a user's signature to the signature on the back of the transaction card.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Embodiments of the present disclosure provide systems and methods for authentication devices that enable transactions with a payment instrument such as a transaction card at different limits, restrictions, and/or other use conditions. As such, embodiments herein provide an authentication device that may be used for modifying default limits, restrictions and/or use conditions of a payment instrument.

Authentication devices may generally be used for various computing purposes including, for example, viewing images, using email or text messaging services, searching stored information of any type, etc. For instance, an authentication device may communicate with another user device such as a mobile device to access user information including images, messages, stored information, etc. In some instances, users may also want to use their authentication devices for conducting transactions. For example, users may want to use their authentication device capabilities to engage in transactions such as making payments for one or more items, products, services, or applications ("products").

Authentication devices may be implemented in various ways including, for example, a money clip, a smart phone case, a wristband, a wallet, a carrying case, a piece of jewelry such as a ring, a wearable device such as a smart watch, eyeglasses, etc.

In various embodiments, a user may use an authentication device that enables a transaction with a payment instrument, e.g., a transaction card such as a credit card, a debit card, a gift card, an electronic card or the like in order to pay for a product. In an embodiment, the transaction card may have one or more default limitations such as an amount limit, restriction and/or use condition defined by a user, by a service provider, or by any other appropriate entity, and in this case, the user may use the transaction card in connection with transactions, for example purchases, up to the limited, defined amount, restriction and/or use condition without requiring any additional steps or actions, for example, without requiring additional authorization. In another embodiment, a user may wish to modify any default limitations, restrictions and/or use conditions placed on the payment instrument, for example, a user may wish to conduct a transaction using the transaction card such as making a purchase for an amount that is higher than the limited, defined amount, and in this case, the user may utilize his or her authentication device capabilities for enabling a payment for the higher amount using the transaction card. In that regard, the user may place the transaction card in an authentication device that is adapted to communicate with the transaction card. For example, the authentication device may include hardware such as a docking mechanism configured to dock or otherwise connect with the transaction card such that the authentication device and the transaction card may communicate. The transaction card may be authenticated on the authentication device via at least one of several ways including biometric means such as a thumb print reader, gesture and/or audio recognition, an image capturing device, or via user inputs that include one or more user identifiers such as a password, a PIN, a username, a user account number, or the like. Once authentication is completed or confirmed as valid, the transaction card may be authorized and activated for use in a modified mode such as in a higher limit mode. That is, the transaction card may be used in connection with transactions for an amount that is higher than the original limited amount. In an embodiment, the user may set up these limits or levels individually. In various embodiments, the transaction card may be authorized for the higher limit mode subject to one or more further restrictions including, for example, for a time-limited period, for a certain number of uses or swipes, for a geographical area, for certain business locations, etc. As such, according to one or more embodiments herein, a payment instrument such as a transaction card may be used in connection with transactions up to one or more default limitations such as a certain amount or under certain restrictions without authorization, and up to a different amount (e.g., a higher amount) or under different or relaxed restrictions, with authorization.

In one embodiment, the authentication device may be used to place a binary restriction on a payment instrument. For example, a payment instrument may simply be restricted from any use at all without authorization. For instance, a situation may involve a travel use wherein one or more payment instruments such as credit cards may be restricted from being used without authorization in a particular travel destination, for example, in another city or country, or for a certain time duration, for example, for 2 weeks, one month, etc.

In an embodiment, authentication and/or authorization of a transaction card may be conducted by a remote location server such as a payment service provider server, for example, implemented by PayPal®, Inc. or eBay®, Inc. of San Jose, Calif., USA.

Advantageously, embodiments of the present disclosure may provide communication security at least in part due to the authentication performed before authorizing different limitations (e.g., higher limits, or expanded or more relaxed restrictions or conditions for use) for a payment instrument such as a transaction card. This may avoid or limit risks in situations where security has been compromised. For example, where a payment instrument such as a transaction card has been lost or stolen, any unauthorized person may be kept from potentially misusing the payment instrument or the information and data therein, thus preventing potential fraudulent transactions. It should be noted that embodiments herein may avoid or limit risks with respect to offline transactions (e.g., at physical business locations) as well as online transactions. For example, some users may be uncomfortable purchasing products online due to potential data or security breaches, for example potentially a higher risk of fraud because a card is not present in an online transaction. In this case, an authentication device according to one or more embodiments may be used to authenticate and authorize a payment instrument before making online purchases. In an embodiment, the authentication device according to an embodiment may connect or communication with a merchant checkout flow to add such a physical level of security. For instance, the authentication device may be configured to physically insert into a computing device interface such as a USB port. The authentication device may communicate to a remote server such as a payment provider server such that when an online transaction takes place, the transaction may be approved. That is, the authentication device may communicate with an intermediary entity such as a payment provider server to authenticate the payment instrument.

Figure 1:
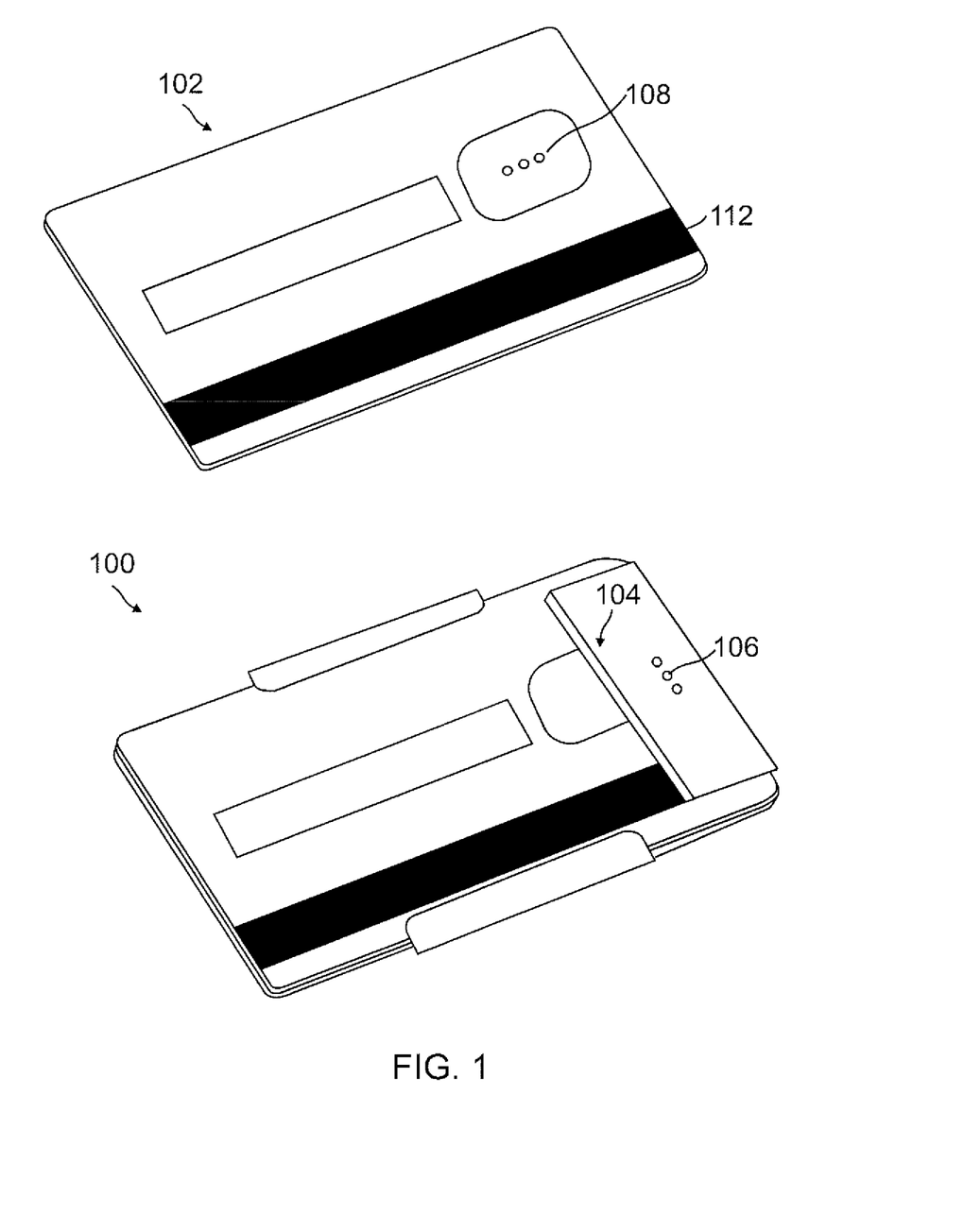
FIG. 1 is a diagram illustrating an authentication device and a payment instrument according to an embodiment of the present disclosure.

Referring now to the drawings wherein the showings are for purposes of illustrating embodiments of the present disclosure only, and not for purposes of limiting the same, FIG. 1 is a diagram illustrating an authentication device and a payment instrument according to an embodiment of the present disclosure.

FIG. 1 illustrates an authentication device 100 that is adapted to receive, engage, dock or otherwise connect or communicate with a payment instrument such as a transaction card 102. In various embodiments, authentication device 100 may be of a credit-card-sized form factor. For example, authentication device 100 may be a money clip or a thin wallet that may hold one or more transaction cards or items generally included in a normal physical wallet. Authentication device 100 is illustrated in FIG. 1 as a money clip according to an embodiment. It should be appreciated that authentication device 100 may be of any suitable form factor, which may be used to implement one or more embodiments of the present disclosure, and it may be, for example, a smart phone case, a wristband, a wallet, a carrying case, a piece of jewelry, a wearable communication device such as a watch, eyeglasses, etc. Also, it should be appreciated that authentication device 100 may be a separate or standalone device such as a money clip, or it may be built into another holder, carrier or container such as a user's wallet, purse or other carrying case. In other embodiments, authentication device 100 may be a mobile device such as a smartphone, a tablet, etc., for example, wherein the mobile device itself may include an input such as a biometric input (e.g. a thumb reader) for authentication. Also, in other embodiments, the transaction card itself may include an input mechanism for changing or altering limitations, restrictions and/or use conditions as well as an authentication input user interface.

In various embodiments, authentication device 100 may not only be used for in-store authentication or in connection with transactions at an entity's location, but it may be used for in-home setup of a payment instrument such as a transaction card. That is, it may be a single standing device that the user may use to set up a card only at home, and may include, for example, a chip card reader. In an example, the user may decide to only put $20 on the card for a specific one time usage, thus limiting the amount if the card should be lost.

Authentication device 100 may include hardware such as a docking mechanism adapted to "dock" or otherwise engage or connect with transaction card 102 wherein the hardware is operable to releasably receive or communicate with transaction card 102. The hardware such as a docking mechanism may include a clip, a clamp, a reader, or any other suitable engagement mechanism, which provides a connection between authentication device 100 and transaction card 102. In an example, the hardware such as a docking mechanism may be positioned at a base portion 104 of authentication device 100. In other examples, the hardware may be positioned on any suitable side, front or back of authentication device 100.

Authentication device 100 may include specialized hardware and/or software for communicating with transaction card 102. For instance, authentication device 100 may include Bluetooth Low Energy (BLE), RFID technology, NFC technology, or any suitable technology configured for communications with transaction card 102. In various embodiments, transaction card 102 may also include a communication device, for example an RFID chip, NFC, etc. to enable communications. Authentication device 100 may also include specialized hardware and/or software for communicating with a remote server or device over a network as will be described in more detail below.

Authentication device 100 may also include one or more input devices or interfaces configured to receive communications including authentication information from a user. For example, authentication device 100 may include an input interface 106 adapted to receive user authentication information such as a scanner for biometric information (e.g., a fingerprint scanner), an image capturing device (e.g., a camera, a video capturing device, etc.), a gesture recognition module, a voice or audio recognition module, or an interface including a keyboard, a keypad, or a touch screen adapted to receive an identifier (e.g., a password, a PIN, a username, etc.) from a user. Authentication device 100 may further include any other components to enable wireless payments.

Transaction card 102 may be of any suitable form factor including, for example, a credit card, a debit card, a gift card or any other type of payment instrument that a user may utilize in connection with a transaction such as purchasing one or more products. In general, a user may carry different types of payment instruments such as transaction card 102 in a wallet, a purse or any other carrying case of the user. In various embodiments, a payment instrument may include a readable code such as a barcode or a QR code. In this regard, a user may obtain multiple readable codes and assign or determine a monetary amount associated with each one of the readable codes. The codes may then may then be scanned or read at a merchant's or any other entity's location. The codes may be merchant or entity specific, and may be managed by a server at a remote location such as a payment provider server.

In an embodiment, a payment instrument may be in the form of an electronic card having a credit card form factor complete with a magnetic stripe such as magnetic stripe 112 of transaction card 102. The payment instrument such as transaction card 102 may also include an input section 108 adapted to receive one or more authentication inputs such as biometric inputs from a user. For example, input section 108 may be a biometric input section (e.g., a fingerprint scanner), or any other suitable user or payment instrument identifier input section (e.g., a PIN pad). In one embodiment, input section 108 may enable a user to place transaction card 102 in an authenticated mode without any further authorization needed so that a transaction including payment may be completed. The payment instrument, in various embodiments, may not display any information or data such as account numbers on a front or back of the payment instrument unless the payment instrument is first authenticated. In response to the payment instrument being authenticated, information or data such as account numbers may be displayed for example, in an e-ink display. In an embodiment, the payment instrument may be associated or include multiple different cards that may be added (or subtracted) to such electronic card form of the payment instrument.

In another embodiment, authentication device 100 may be of a form factor that enables a user to store one or more of his or her payment instruments such as transaction cards or other instruments that the user normally carries in a normal or physical wallet. As such, embodiments herein may provide users an opportunity to digitize cards that they normally carry in their physical wallets. In an embodiment, the authentication device may include a display configured to show an image of a user's card such as a user's identification or ID card. The displayed image along with an authentication interface, for example, a user's biometric input such as a thumb reader interface, may provide authentication that may be reliable enough to be accepted in official circumstances such as by police, at an airport, for car rentals, etc.

According to one or more embodiments of the present disclosure, authentication device 100 may include specialized hardware and/or software that may be used for placing transaction card 102 in an authenticated mode for use in connection with transactions of different or modified limits, restrictions and/or use conditions based on authorization of the user, the payment instrument and/or the authentication device. For example, a user may have a transaction card such as a credit card that has a limited pre-defined amount of $75. As long as the user uses the credit card in connection with transactions of an amount no higher than the limit of $75, the user may use the credit card without requiring any additional steps or actions such as additional authorization. However, in situations where the user wishes to spend more than the limited pre-defined amount (e.g., over $75) or bypass other limits, restrictions or use conditions, the user may use the authentication device to place the credit card in an authenticated mode for a higher amount or other lifted or relaxed limits, restrictions or use conditions upon authorization.

First, the transaction card (or user) may be authenticated on the authentication device. In that regard, as described above according to one or more embodiments, authentication device 100 may have an input device such as one or more components for authentication including at least one of a scanner, biometrics, an image capturing device, a gesture recognition module, a voice or audio recognition module or an interface including a keyboard, a keypad, or a touch screen adapted to receive an identifier (e.g., a password, a PIN, a username, etc.) from a user. In an embodiment, transaction card 102 may also include one or more authenticating components such as a biometric scanner adapted to receive biometric inputs such as a user's fingerprint.

Second, once transaction card 102 (or the user) is authenticated, the transaction card 102 may be authorized for use in a different limitation mode (e.g., a higher amount of more than $75). In various embodiments, the different limitation mode may be authorized for a pre-defined limit, restriction or use condition set by a user, by a remote location server, or by any other appropriate server. For example, a different limitation mode may be set for a higher amount and may be authorized for up to an amount of a cost of a product in connection with a transaction, or it may be authorized for a pre-defined higher limit such as up to $150, or it may be authorized for an unlimited amount. Furthermore, authorization may be set for different restrictions or use conditions including, for example, for a time-limited period (e.g., two hours, a day, a week, etc.), for a certain number of swipes or uses (e.g., 1 or more), for use within a geographical area (e.g., within 1 mile, 5 miles, 10 miles, a city, etc.), for use in certain business locations (e.g., a bookstore, a restaurant, etc.), or the like.

In various embodiments, an authentication device may be used to modify a default limitation, restriction and/or use condition based on a specific user input. For example, a payment instrument may have a limitation for making purchases up to $100 without authorization, and in this case, a user may modify the limitation, for example increase the limitation to $300, by entering a corresponding user input such as placing an index finger in a biometric input, or using a certain gesture, or a corresponding identifier such as a PIN, password, etc. As such, a user may use a certain input that corresponds with modifying a certain limitation, restriction and/or use condition. Different user inputs may be used to obtain different results.

Figure 2:
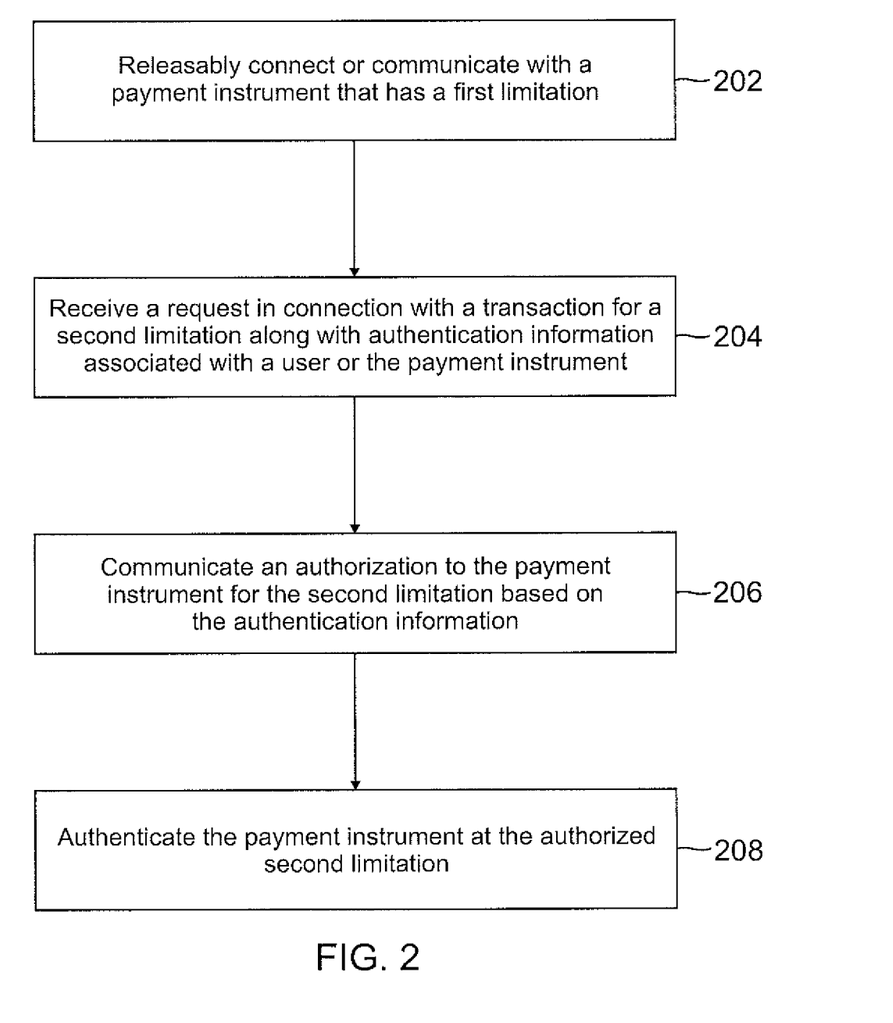
FIG. 2 is a flowchart illustrating a method for an authentication device enabling different limits, restrictions and/or use conditions for a payment instrument according to an embodiment of the present disclosure.

Referring now to FIG. 2, a flowchart illustrates a method for an authentication device enabling different limits, restrictions and/or use conditions for a payment instrument according to an embodiment of the present disclosure. It should be noted that the method of FIG. 2 may be implemented by authentication device 100 illustrated in FIG. 1 according to an embodiment.

A user may utilize a payment instrument such as a credit card in many different situations in connection with transactions. In that regard, the user may carry different types of credit cards in a wallet, a purse, or any other user carrying case. In certain situations, a payment instrument such as a transaction card may be limited to one or more user-defined or service provider-defined limits, restrictions and/or use conditions without needing any further action or authorization. For example, a payment instrument such as a transaction card associated with a payment service provider (e.g., PayPal®, Inc.) may allow a user to set a funding limit for the transaction card up to a specific amount such as up to $75, $100, $500, etc., without needing any further authorization. In these situations, the transaction card may be used in connection with transactions such as making payments for no more than the specified funding limit without the need for authorization. However, there may be situations wherein a user may need more funds to conduct a transaction. For example, a user having a transaction card limited to transactions up to $75 may want to make a purchase for $100, that is, the user may want to increase the funding or spending limit of the transaction card from the original user-defined limit of $75 to a higher limit of $100. In this case, the user may use his or her authentication device to enable the transaction card for the higher limit.

In other examples, the transaction card may be unauthorized for use in current transactions due to one or more certain restrictions, use conditions or other limitations, including, for instance, a number of times the card has been used during a certain time period, the total dollar amount the card has been used during a certain time period, the transaction being conducted with a restricted merchant or location, the transaction being conducted for a purchase of a restricted product, the transaction being conducted in a restricted area, region, city, etc., the transaction being conducted at a certain time of year, the transaction being conducted during travel such as in a different country or within a trip duration, etc. In such situations, the user may use his or her authentication device to enable a transaction to make the purchase for a current transaction, where otherwise the payment request may have been denied.

In block 202, an authentication device may releasably connect or communicate with a payment instrument having a first limitation. In an example, a user may pull out a credit card having a pre-defined limitation from his or her wallet and insert, dock, or otherwise connect the credit card into his or her authentication device (for example, a money clip as illustrated in the embodiment of FIG. 1). The credit card may have a certain default spending limit, for example, a limit of up to $50 authorized by a remote server such as a payment service provider server. As long as the user utilizes the credit card in connection with transactions up to the default limit of $50, no additional authorization may be required. In other examples, the pre-defined limitation may include other restrictions or use conditions for the credit card such as time limits, number of uses, location restrictions, etc.

In block 204, the authentication device may receive a request in connection with a transaction for a second limitation along with authentication information associated with the user or the payment instrument. For example, if the user wishes to use the payment instrument to charge an amount higher than the original pre-defined funding limit of, for example $50, additional authorization may be required. In that regard, the user may enter appropriate transaction information (e.g., amount requested) as well as authentication information on the authentication device. As described above according to various embodiments, the authentication device may include one or more components or devices for receiving authentication information, including, for example, a scanner, a biometric interface, gesture recognition, audio recognition, an image capturing device, a display and/or an interface for receiving one or more user identifiers such as a password, a PIN, a user ID, etc.

In block 206, the authentication device may communicate an authorization to the payment instrument for a second limitation based on the authentication information. In that regard, the authentication device may transmit or push the authentication information received from a user to a remote server over a network. The remote server, for example a payment service provider server, may determine whether the authentication information is valid for a particular user account associated with the user, the payment instrument, or the authentication device. If the authentication information is determined to be valid, the user or payment instrument may be authenticated and authorized for a second limitation, for example a higher funding limit. As discussed above according to one or more embodiments, the second (e.g., higher funding) limitation may be based on pre-defined limitations established in connection with the user account. The authentication device may then communicate the authorization to the payment instrument that is docked or otherwise connected into the authentication device.

In block 208, the payment instrument is authenticated at the authorized second limitation. In this case, a user may conduct transactions such as making a payment for a product using the payment instrument at the second limitation.

In an example, a user having a payment provider service card having a default limit of up to $75 in his or her wallet may try to charge $100. As a result, the card may be declined. The user may then dock the card into his or her authentication device, e.g., money clip. Upon authentication information of the user or the card being received from the user and then transmitted or pushed to the payment provider service, the card may be authorized and the user given the green light or approval to charge the $100. In various embodiments, default limitations, restrictions or use conditions of a transaction card may be altered via an authentication device that is a smartphone, a tablet, or other mobile device, for example, wherein the mobile device itself may include an input such as a biometric input (e.g. a thumb reader) for authentication. Also, in other embodiments, the transaction card itself may include an input mechanism for changing or altering limitations, restrictions and/or use conditions as well as an authentication input user interface. As such, the card limit is raised by authorization. That is, a card may have one limitation without authorization, and another limitation with authorization.

Advantageously, a payment instrument such as a transaction card may be enabled by an authentication device so that it may be easily used for transactions at different limits, restrictions or conditions upon receiving valid authentication information. That is, an authentication device may be used to modify one or more limitations, restrictions and/or use conditions placed on a payment instrument. In these situations, no information may have to be provided to a merchant, and more control and security may be provided.

Figure 3:
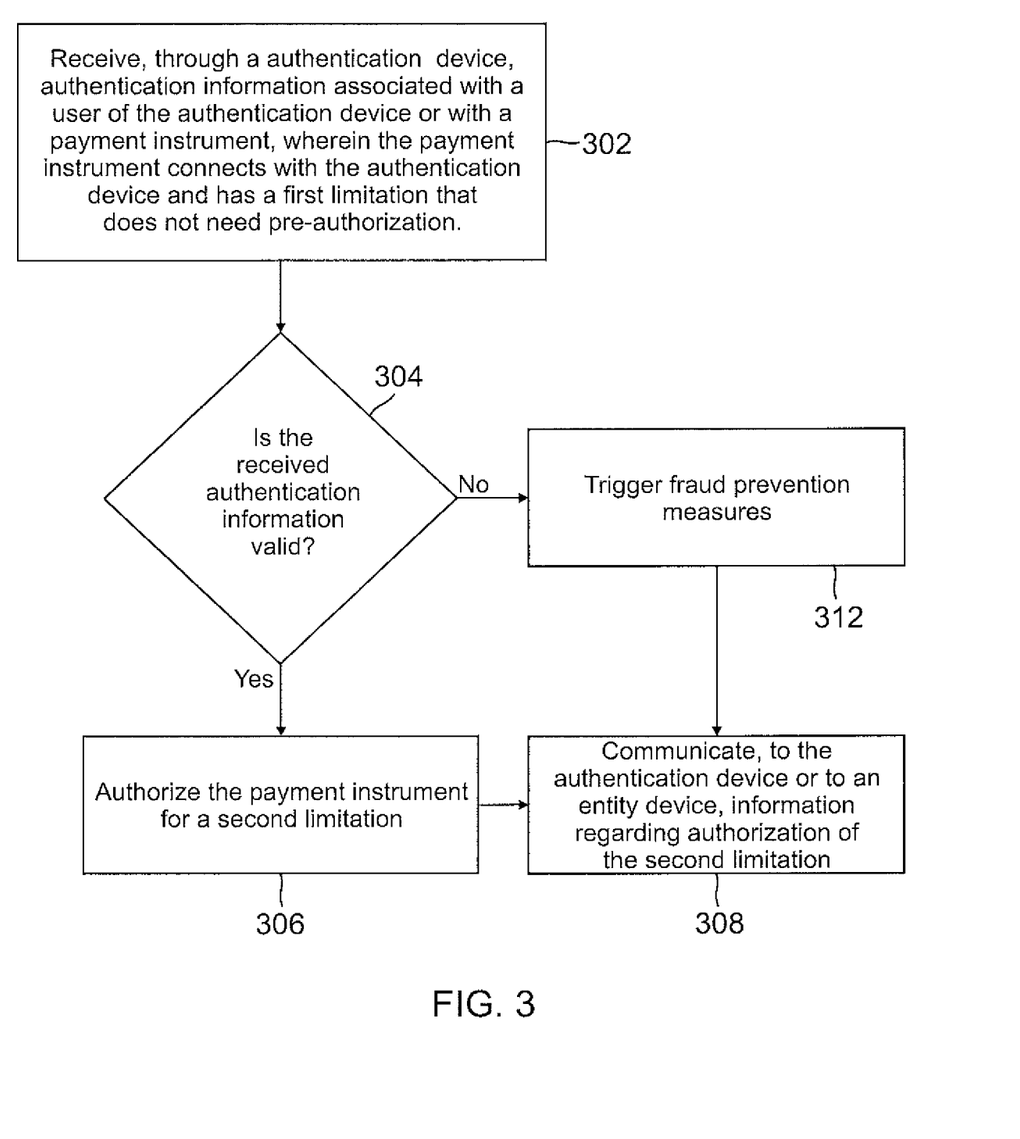
FIG. 3 is a flowchart illustrating a method for a system enabling a payment instrument to be used at different limitations according to an embodiment of the present disclosure.

Referring now to FIG. 3, a flowchart illustrates a method for a system enabling a payment instrument to be used at different limitations according to an embodiment of the present disclosure. It should be noted that limitations may refer to any limits, restrictions, and/or any other use conditions for a payment instrument that may be changed or modified upon authentication.

As described above according to one or more embodiments, a user may use a payment instrument, for example a credit card out of his or her wallet, in connection with transactions, for example, to make purchases or payments up to a first pre-defined or default limit without the need for any pre-authorization. But in certain situations wherein the user wishes to use the payment instrument in connection with transactions, for example, to make purchases up to at least a second funding limit, which may be higher than the first pre-defined limit, the user may easily use an authentication device to place the payment instrument in an activated or authenticated mode for at least the second funding limit. In that regard, the user may insert, place, dock or otherwise connect the payment instrument with or into the authentication device.

In block 302, a system may receive, by a receiver through an authentication device, authentication information associated with a user of the authentication device or with a payment instrument, wherein the payment instrument connects with the authentication device and has a first limitation that does not need pre-authorization. In that regard, the user may enter or input authentication information such as biometric information, gestures, voice, or one or more identifiers such as a password, a PIN, etc., on the authentication device. The authentication device may push the authentication information to the system such as a server at a remote location, for example, a payment service provider server.

In block 304, the system determines whether the received authentication information is valid. Notably, the system such as a server at a remote location may maintain one or more user accounts and associated user information as will be described in more detail below. In that regard, the system may compare received authentication information with user information maintained at the remote location server to determine validity. If the received authentication information matches the user information maintained at the remote location, the authentication information may be deemed to be valid.

In block 306, if the system determines that the received authentication information is valid, the system authorizes the payment instrument for a second limitation. In block 312, if the system determines that the received authentication information is not valid, the system may trigger fraud prevention measures, for example, a notice may be transmitted of possible fraud or misuse from a payment provider server, and/or additional limitations, restrictions and/or user conditions may be placed on the payment instrument (e.g., a reduced funding limit, a more limited geographical area, a more restricted time limit, etc.). In an embodiment, the payment instrument may not be declined, but the authorization for modified limitations, restrictions and/or use conditions (e.g., a higher funding limit) may be invalid due to an increased likelihood of misuse or fraud, for example, because the payment instrument may have been stolen.

In block 308, the system communicates, to the authentication device or to an entity device, information regarding authorization of the second limitation. For example, if the system declines authorization of the second limitation, the system communicates to the authentication device that the payment instrument is not authorized for the second limitation. If the system authorizes a second limitation, the system communicates to the authentication device, and/or a merchant device or other appropriate entity device, that the payment instrument is authorized for the new limitation such that the payment instrument is authorized and may be used for transactions at the second limitation, for example, for a higher spending amount. In various embodiments, the second limitation may include other restrictions or use conditions, including, for example, a time limit, a number or swipes or uses, a geographical region, a business location, or the like.

Figure 4:
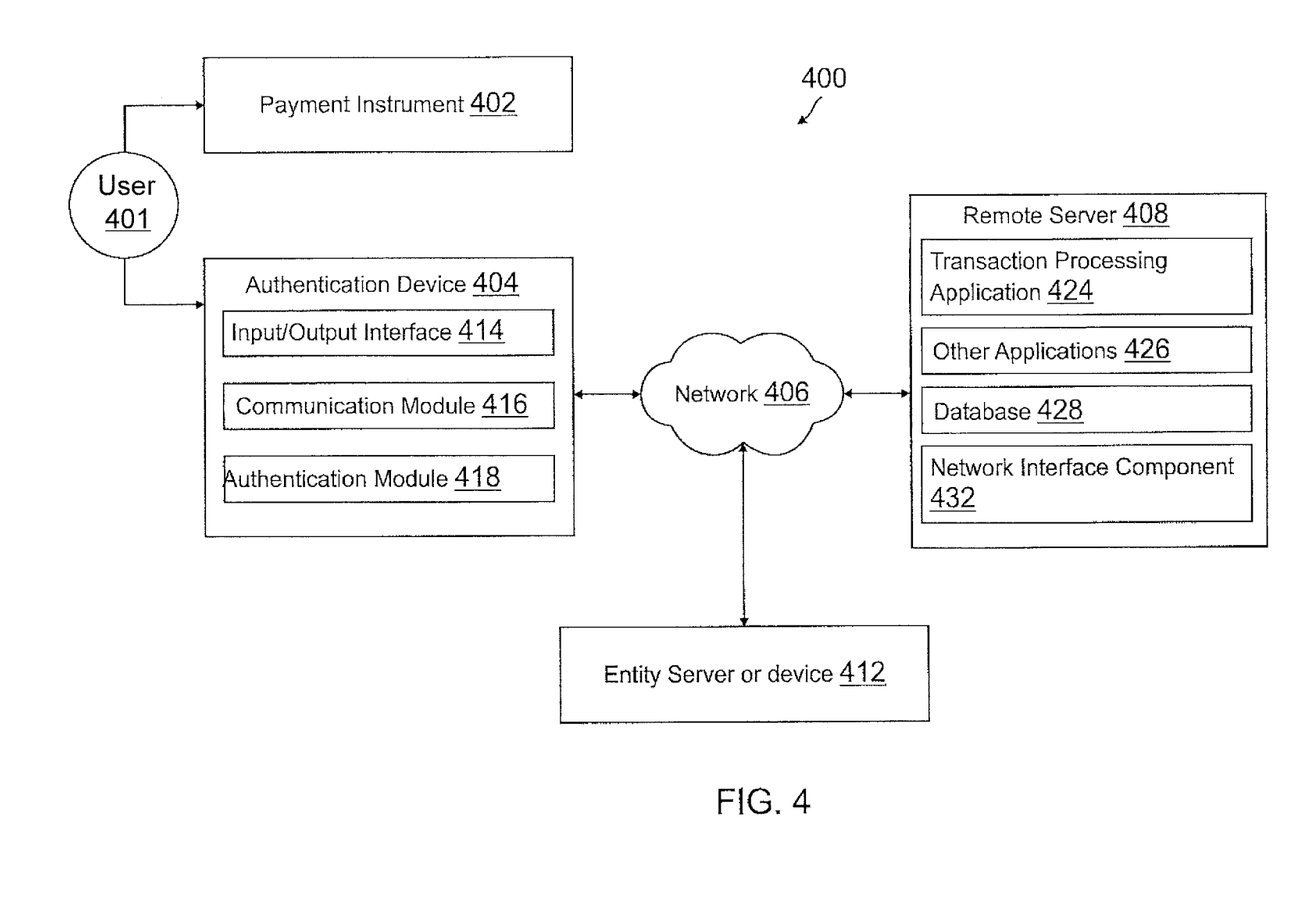
FIG. 4 is a block diagram of a networked system suitable for implementing one or more processes described herein according to an embodiment of the present disclosure.

Referring now to FIG. 4, a block diagram of a networked system 400 suitable for implementing one or more processes described herein is illustrated according to an embodiment of the present disclosure. It should be noted that the system illustrated in the embodiment of FIG. 4 may be used to implement the methods illustrated in FIGS. 2 and 3 according to one or more embodiments.

As shown, system 400 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 4 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

In system 400, a user 401 desiring to conduct a transaction such as purchasing or paying for one or more products may select to pay for such products with a payment instrument 402. Payment instrument 402 may be, for example, any type of transaction card such as a smart card, a gift card, or a traditional credit card or debit card issued by a financial institution or a payment service provider. Payment instrument 402 may include account information that may be printed or displayed on a front and/or back portion of the payment instrument 402. Account information may include, for example, a personal account number (PAN), expiration date, a security code and/or the name of an authorized user. This account information may also be stored on a magnetic stripe of the payment instrument that may be located, for example, on a back portion of the payment instrument 402.

In various embodiments, payment instrument 402 may be authorized for use in connection with transactions at pre-defined limitations, restrictions or use conditions, for example, in connection with transactions worth up to a specified limited amount. For example, user 401 may utilize payment instrument 402 to purchase products up to the specified limited amount (or under a pre-defined restriction or use condition) without requiring any further steps or actions such as pre-authorization, for example, from a payment service provider. In other embodiments, user 401 may wish to conduct a transaction for a different amount (or a different restriction or use condition), for example, an amount higher than the specified limited amount. In this case, user 401 may use authentication device 404 to easily obtain authorization for payment instrument 402 for a new amount that may be higher than the original specified limited amount (or a new restriction or use condition that may be more relaxed or lighter than a pre-defined restriction or use condition).

In an embodiment, when user 401 presents payment instrument 402 at an entity server or device 412, for example, to a salesperson at a merchant's location to pay for products, the salesperson may swipe payment instrument 402 on a magnetic stripe card reader included in a merchant's terminal or point of sale device (POS). In other embodiments, the magnetic stripe of payment instrument 402 may be replaced by, or be provided in addition to, a near field communications (NFC) transponder including, for example, an RFID chip, a contactless smart card, etc. In this case, the POS may read the transaction card's information via use of the NFC transponder. In various embodiments, the NFC transponder of payment instrument 402 (by itself or in addition to the magnetic stripe) may be used for communications between payment instrument 402 and authentication device 404. Payment instrument 402 may also include a display capable of displaying alphanumeric characters, graphics, etc. Such display may be an electro-optic display such as a flexible LCD screen, a light emitting polymer display, etc. as generally known in the art.

In one or more embodiments, payment instrument 402 may generate a digital signature of payment instrument 402, which may be communicated to authentication device 404 in response to docking or otherwise connecting payment instrument 402 into authentication device 404. Payment instrument 402 may include a processor configured to provide authentication information to the magnetic stripe, to the payment instrument's NFC transponder and/or to a display of payment instrument 402.

As discussed above according to one or more embodiments, a user desiring to conduct a transaction such as purchasing products with a payment instrument at a new limitation requiring authorization (i.e., at a limitation that is different than a pre-defined limitation that does not require authorization), may select to authenticate and authorize payment instrument 402 for the new limitation by using authentication device 404.

Authentication device 404 may be implemented using any appropriate combination of hardware and/or software configured for wired and/or wireless communication over a network. For example, authentication device 404 may be implemented as a money clip, a smart phone case, a key fob, a wearable device such as a watch, eyeglasses, etc., or it may be built into a user's item such as a wallet, a purse, or the like, with appropriate computer hardware, and/or other types of computing devices capable of transmitting and/or receiving data. In other examples, authentication device 404 may be a smartphone, a tablet, or other mobile device, for example, wherein the mobile device itself may include an input such as a biometric input (e.g. a thumb reader) for authentication. Also, in other embodiments, a transaction card itself may include an input mechanism for changing or altering limitations, restrictions and/or use conditions as well as an authentication input user interface. The authentication device may be managed or controlled by any suitable processing device.

Authentication device 404 may include an input/output interface 414, at least one communication module 416, and an authentication module 418. In various embodiments, a communication module 416 may be adapted to communicate with payment instrument 402 and/or remote server 408 over network 406 and/or directly. Thus, communication module 416 may include a DSL (e.g., Digital Subscriber Line) modem, a PSTN (Public Switched Telephone Network) modem, an Ethernet device, a broadband device, a satellite device and/or various other types of direct wired and/or wireless network communication devices including microwave, radio frequency, infrared, Bluetooth, and NFC components. Communication module 416 may communicate directly with another nearby device or with payment instrument 402 using short range communications, such as Bluetooth Low Energy, LTE Direct, radio frequency, infrared, Bluetooth, and NEC. Thus, communication module 416 may include various specialized short range communication modules that may connect with nearby devices or with payment instrument 402.

In that regard, payment instrument 402 may also include a communication module that may include an RFID device, Bluetooth, a near field communication (NFC) transponder or an infrared communication device for communications between authentication device 404 and payment instrument 402.

Authentication device 404 may include other applications as may be desired in particular embodiments to provide features to authentication device 404. For example, other applications may include security applications for implementing client-side security features, programmatic client applications for interfacing with appropriate application programming interfaces (APIs) over network 406, or other types of applications. Other applications may also include email, texting, voice and IM applications that allow a user to send and receive emails, calls, texts, and other notifications through network 406. In various embodiments, other applications may include financial applications, such as banking, online payments, money transfer, or other applications associated with remote server 408. Other applications may include browser applications enabling authentication device 404 to communicate with other user devices and access websites and/or receive information from one or more online sources. Additionally, other applications may include social networking/media application, including microblogging applications. Other applications may contain other software programs, executable by a processor, including a graphical user interface (GUI) configured to provide an interface to the user for example via input/output interface 414. In various embodiments, authentication device 404 may also include an image capturing device, for example, a camera to capture images, which are then communicated back to a user device such as a mobile device. However, there are many more functions that may be performed by an authentication device.

Authentication device 404 may also include, for example other pre-loaded applications, for example, a payment provider service application to facilitate authorization of financial transactions. In addition, authentication device 404 may include various applications as may be desired in particular embodiments to provide desired features to authentication device 404.

Authentication device 404 may further include a database storing content therein or which may be accessed on a separate user device. The database may include, for example, identifiers such as operating system registry entries, cookies associated with input/output interface 414, authentication module 418, communication module 416 and/or other applications, identifiers associated with hardware of authentication device 404, or other appropriate identifiers, such as identifiers used for payment/user/device authentication or identification. In one embodiment, identifiers in the database may be used by entity server or device 412 and/or remote sever 408, such as a payment service provider server, to associate authentication device 404 with a particular account maintained by the remote server 408.

In various embodiments, the database may further include user information data to access user accounts, such as payment account information for a payment account with remote server 408. Thus, the database may include user personal information (e.g. a name, social security number, user financial information, or other identifying information), a user account identifier, and a user device identifier. In various embodiments, the database may include online account access information. The database may also store transaction histories of monetary transfers. The database may include transaction histories stored for later use.

Authentication device 404 may also include an input/output interface 414. In various embodiments, input/output interface 414 may include one or more devices configured to receive user authentication information. For example, an input interface of authentication device 404 may include a scanner, a biometric device, gesture recognition, audio recognition, or an interface such as a keyboard, a keypad or a touchscreen adapted to receive user identification information. In that regard, user 401 may enter or input one or more user identifiers via input/output interface 414. One or more user identifiers may be implemented, for example, as operating system registry entries, cookies associated with a browser application, identifiers associated with hardware of authentication device 404, or other appropriate identifiers. An output interface of authentication 404 may include a display, a light indicator, a voice or audio indicator, etc.

Upon the user 401 docking or otherwise connecting payment instrument 402 into authentication device 404, authentication device 404 may initiate a connection to remote server 408, which may include for example a payment provider service server, via network 406. Authentication device 404 is adapted to communicate, push or otherwise transmit authentication information of user 401 or payment instrument 402 to remote server 408. Furthermore, in one or more embodiments, authentication device 404 may be configured to transmit a digital signature associated with authentication device 404 to remote server 408. As is known in the art, digital signatures are provided to authenticate the sender of information, for example, in this case, the authentication device 404. The importance of high confidence in sender authenticity is especially obvious in a financial context.

In addition, authentication information including user or payment instrument authentication information, along with other pertinent transaction information such as a date, a time, a location, a payment amount, etc. may be transmitted to remote server 408 by authentication device 404. Remote server 408 may store some of the received information including the authorization information, and any account and/or transaction information and authenticate the information received from authentication device 404 according to the received information. Remote server 408 may confirm or reject the authentication information (along with any other transaction information) depending on whether the received information, for example, a user identifier, biometric information, etc., matches pre-determined information maintained at remote server 408. In one embodiment, user authentication information such as a user identifier may be used by remote server 408 to associate payment instrument 402, authentication device 404 (or correspondingly the user) with a particular account maintained by remote server 408. In an embodiment, a user input such as a specific user identifier, gesture or biometric input may be associated with a particular modification of one or more limitations, restrictions and/or use conditions of a payment instrument. Once confirmed, remote server 408 may send a message confirming authorization for a new limit, restriction, or use condition to authentication device 404 indicating authorization for a transaction at the new limit, restriction or use condition with payment instrument 402. Conversely, if the authorization is invalid, remote server 408 may reply this result to authentication device 404 and may trigger fraud prevention measures.

Authentication device 404 may further include an authentication module 418 that may include applications and associated hardware that may interface with an application programming interface (API) of a remote server application in order to provide for authorization of new limits, restrictions and/or use conditions. Authentication module 418 may allow for authentication of user 401 or payment instrument 402 in order to initiate transmission of a request for a new limit, restriction and/or use condition. In various embodiments, authentication module 418 may create a notification such as an icon, a green light, a sound, etc. on an interface such as input/output interface 414 of authentication device 404 that the user may view on the authentication device such that the authentication device confirms or alerts the user that a new limit, restriction and/or use condition for a payment instrument may be authorized for engaging in a transaction.

Remote server 408 may be maintained, for example, by an online payment service provider, which may provide payment service to a user. In this regard, remote server 408 includes one or more processing applications, which may provide authorization for transactions at different limits, restrictions and/or use conditions. In one example, remote server 408 may be provided by PAYPAL®, Inc. or eBay®, Inc. of San Jose, Calif., USA. However, in other embodiments, remote server 408 may be maintained by or include a merchant, financial services provider, and/or other service provider, which may provide authorization services for enabling a transaction with a payment instrument through an authentication device.

Remote server 408 of FIG. 4 includes a transaction processing application 424, other applications 426, a database 428, and a network interface component 432. Transaction processing application 424 and other applications 426 may correspond to processes, procedures, and/or applications executable by a hardware processor, for example, a software program. In other embodiments, remote server 408 may include additional or different software as required.

Transaction processing application 424 may execute one or more modules of remote server 408 to receive and/or transmit information between authentication device 404 and payment instrument 402 for processing and completion of authorization requests for user 401. In this regard, transaction processing application 424 may be configured to receive and/or transmit information to and from authentication device 404 for processing and completion of authorization of payment instrument limits, restrictions and/or use conditions. For example, transaction processing application 424 may include one or more applications to process a request for authorization of a new monetary amount in connection with payment instrument 402. Transaction processing application 424 may receive a request, via authentication device 404 for authorization of a new monetary amount in connection with payment instrument 402. The request may include authentication information corresponding to user 401 or payment instrument 402. Transaction processing application 424 may complete the request for the authorization of the new monetary amount using the authentication information. Additionally, transaction processing application 424 may transmit a notification to authentication device 404 of the authorization or approval, including any terms for the approval (e.g. monetary amount, time or geographical restrictions, etc.). Transaction processing application 424 may provide transaction histories for use by authentication device 404 to complete or retain a history of the approvals.

In various embodiments, remote server 408 includes other applications 426 as may be desired in particular embodiments to provide features to remote server 408. For example, other applications 426 may include security applications for implementing server-side security features, programmatic server applications for interfacing with appropriate application programming interfaces (APIs) over network 406, or other types of applications. Other applications 426 may contain software programs, executable by a processor, including a graphical user interface (GUI), configured to provide an interface to a user.

Additionally, remote server 408 includes a database 428 such that remote server 408 may maintain data or information related to, for example, account information, identifiers such as passwords, PINs, passcodes, etc., as well as user, payment instrument, entity or terminal identifiers, and/or authentication device information such as authentication device identifiers. Data or information may be stored according to various schemes for coordinating accounts, identifiers, or other user, payment instrument, authentication devices and entity information. As previously discussed, user 401 may establish one or more user accounts with remote server 408. User accounts in database 428 may include account information, user information, such as name, address, birthdate, payment/funding information, additional user financial information, and/or other desired user data. User 401 may link user accounts to authentication device 404 through an authentication device identifier. Thus, when an authentication device identifier corresponding to authentication device 404 is transmitted to remote server 408, a user account belonging to user 401 may be found. Database 428 may further store requests for changing monetary amount limits in connection with a payment instrument and/or transaction history for completed approvals and/or transactions.

In various embodiments, remote server 408 includes at least one communication module (NIC) 432 adapted to communicate with network 406 and/or other networks or devices including authentication device 404. In various embodiments, network interface component 432 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RE), and infrared (IR) communication devices.

Authentication device 404, payment instrument 402, entity server 412 and remote server 408 may each include one or more processors, memories, and other appropriate components for executing instructions such as program code and/or data stored on one or more computer readable mediums to implement the various applications, data, and methods described herein. For example, such instructions may be stored in one or more computer readable mediums such as memories or data storage devices internal and/or external to various components of the system, and/or accessible over network 406, which may be implemented as a single network or a combination of multiple networks. For example, in various embodiments, network 406 may include the Internet or one or more intranets, landline networks, wireless networks, and/or other appropriate types of networks. Thus, network 406 may correspond to small scale communication networks, such as a private or local area network, or a larger scale network, such as a wide area network or the Internet, accessible by the various components of system 400.

Figure 5:
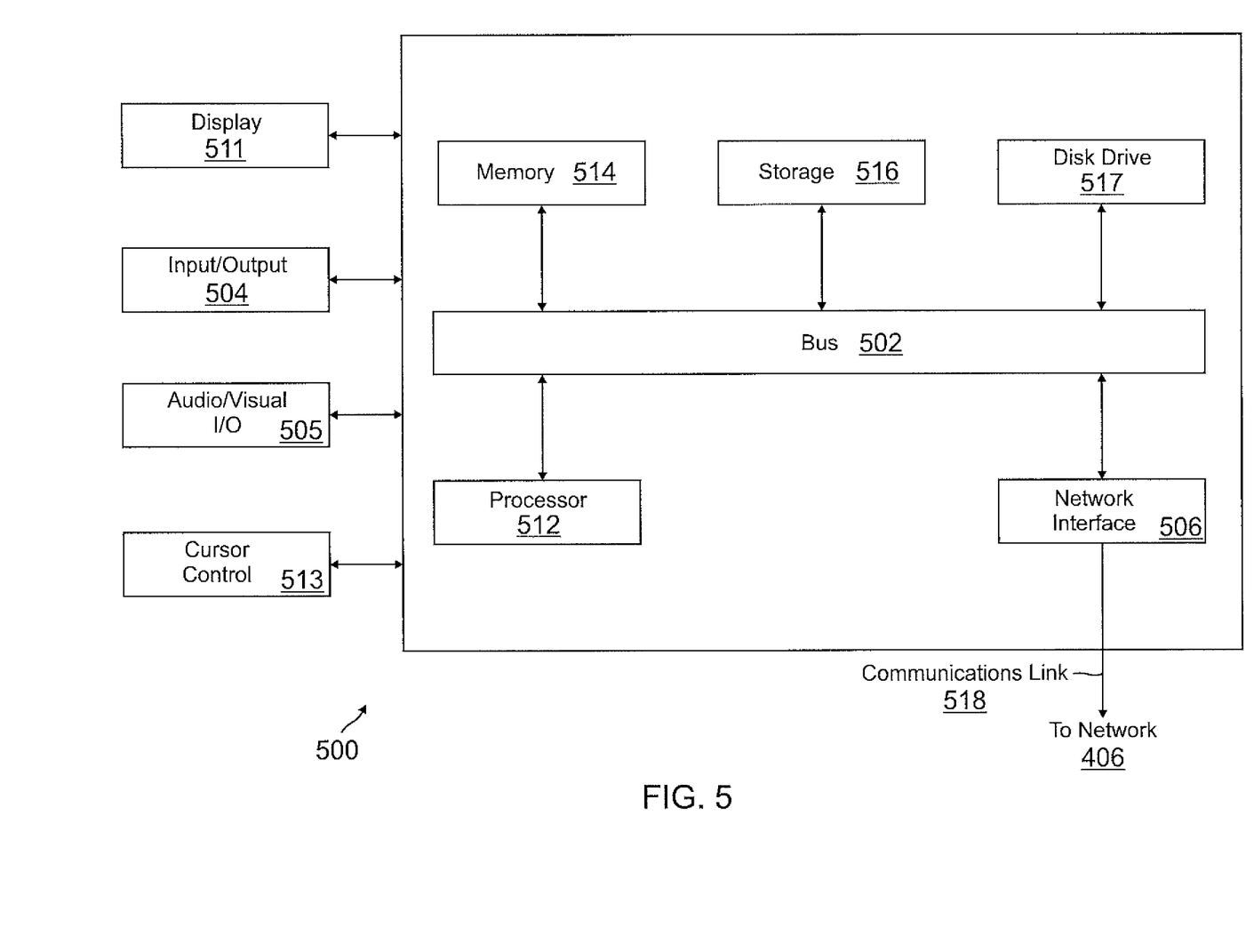
FIG. 5 is a block diagram of a computer system suitable for implementing one or more components in FIG. 1 and FIG. 4, according to one or more embodiments.

FIG. 5 is a block diagram of a computer system suitable for implementing one or more components in FIG. 1 or FIG. 4, according to one or more embodiments. In various embodiments, an authentication device may comprise a personal computing device (e.g., in the form of a money clip, jewelry, a wallet, a purse, a Bluetooth device, a key FOB, a badge, a wearable device such as a watch, eyeglasses, etc.) capable of communicating with a network. An entity server or device and/or a remote server may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, inputting gestures and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, an entity server or device such as a merchant device, or a service provider server via network 406. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution, Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a network interface component configured to:
receive, over a network, authentication data from a wearable authentication device communicatively coupled with a payment instrument, wherein the authentication data comprises a first digital signature associated with the payment instrument and a second digital signature associated with the wearable authentication device;
a transaction processing application coupled to the network interface component, the transaction processing application comprising a non-transitory memory and one or more hardware processors coupled to the non-transitory memory and configured to execute instructions from the non-transitory memory to cause the transaction processing application to perform operations comprising:
authenticating the payment instrument with the first digital signature and the wearable authentication device with the second digital signature based on a comparison of the authentication data to predetermined user information;
authorizing an increase in a transaction limit of the payment instrument up to a second limitation that exceeds a first limitation associated with the payment instrument based on the authenticating of the payment instrument and the wearable authentication device, the first limitation corresponding to a pre-authorized threshold for transactions processed with the payment instrument; and
communicating, to the wearable authentication device over the network, authorization data indicating the authorizing of the increase in the transaction limit of the payment instrument up to the second limitation for authenticating and authorizing the payment instrument through the wearable authentication device prior to occurrences of transactions having defined amounts beyond the first limitation to reduce occurrences of fraudulent transactions associated with the payment instrument.

2. The system of claim 1, wherein the first limitation and the second limitation are limitations applied to single transactions.

3. The system of claim 1, wherein the second limitation is authorized for a number of uses of the payment instrument.

4. The system of claim 1, wherein the second limitation is authorized for a time period.

5. The system of claim 1, wherein the first limitation is associated with a first geographical area or one or more first business locations, and the second limitation is associated with a second geographical area greater than the first geographical area or a number of second business locations greater than the one or more first business locations.

6. The system of claim 1, wherein the authentication data comprises user identity data associated with the payment instrument, further comprising determining a type of the authentication data based at least in part on a type of the user identity data, wherein the user identity data comprises at least one of a biometric input, a gesture, a PIN, or a password, and wherein the operations further comprise:
determining the second limitation in response to the determining the type of the authentication data.

7. The system of claim 1, wherein the operations further comprise: determining that the authentication data is not valid; and denying authorization of the increase in the transaction limit to the second limitation based on the determining that the authentication data is not valid.

8. A method comprising:
receiving, electronically by a hardware processor in a transaction processing application of a remote server over a network, authentication data from a wearable authentication device communicatively coupled with a payment instrument, wherein the authentication data comprises a first digital signature associated with the payment instrument and a second digital signature associated with the wearable authentication device;
determining, electronically by the hardware processor, a validity of the authentication data by authenticating the payment instrument with the first digital signature and the wearable authentication device with the second digital signature based on a comparison of the authentication data to predetermined user information;
authorizing, electronically by the hardware processor, an increase in a transaction limit of the payment instrument up to a second limitation that exceeds a first limitation associated with the payment instrument, the first limitation corresponding to a pre-authorized threshold for transactions processed with the payment instrument based on the authenticating of the payment instrument and the wearable authentication device, the first limitation corresponding to a pre-authorized threshold for transactions processed with the payment instrument; and
communicating, electronically by the hardware processor, to the wearable authentication device over the network, authorization data authorizing the increase in the transaction limit of the payment instrument up to the second limitation for authenticating and authorizing the payment instrument through the wearable authentication device prior to occurrences of transactions having defined amounts beyond the first limitation.

9. The method of claim 8, further comprising: activating the payment instrument for the second limitation.

10. The method of claim 8, wherein the determining the validity of the authentication data comprises comparing the authentication data to data in a data structure of a database that comprises the predetermined user information.

11. The method of claim 8, wherein the authentication data comprises user identity data associated with the payment instrument that comprises at least one of biometric data, gesture data, image data, audio data, or a user identifier.

12. The method of claim 8, further comprising: modifying a mode of the payment instrument from a first mode associated with the first limitation to a second mode associated with the second limitation based on the validity of the authentication data, the second limitation indicating a restriction or a use condition that includes a time limit for use of the payment instrument, a number of uses of the payment instrument, a geographical area, or a business location.

13. The method of claim 8, further comprising: effecting a transaction having a defined amount up to the second limitation using the payment instrument.

14. A wearable authentication device comprising:
- an authentication module comprising a docking mechanism arranged at a base portion of the authentication module and configured to receive a payment instrument with the docking mechanism and to communicate with the payment instrument through the docking mechanism;
- an input interface coupled to the authentication module and configured to receive a request to increase a transaction limit of the payment instrument from a first limitation to a second limitation that exceeds the first limitation; and
- a communication module coupled to the authentication module and the input interface and configured to:
  - receive a first digital signature associated with the payment instrument through the docking mechanism from the payment instrument,
  - transmit authentication data to a remote server over a wireless network, and
  - receive authorization data for the payment instrument from the remote server over the wireless network, wherein the authentication data comprises user identity data associated with the payment instrument, the first digital signature, and a second digital signature associated with the wearable authentication device, and wherein the authorization data authorizes the increase in the transaction limit of the payment instrument up to the second limitation for authenticating and authorizing the payment instrument through the wearable authentication device prior to occurrences of transactions having defined amounts beyond the first limitation.

15. The wearable authentication device of claim 14, wherein the user identity data further comprises a type of the user identity data and wherein the second limitation is based, at least in part, on the type of the user identity data.

16. The wearable authentication device of claim 15, wherein the input interface includes one or more of a biometrics scanner, an image capturing device, a gesture recognition module, a voice or audio recognition module, or an interface including a keyboard, a keypad, or a touch screen adapted to receive an identifier from a user and wherein the type of the user identity data is one of a biometric input, a gesture, a PIN, or a password.

17. The wearable authentication device of claim 14, wherein the input interface is further configured to receive the user identity data from a user input.

18. The wearable authentication device of claim 14, wherein the wearable authentication device further comprises a mobile device.

19. The wearable authentication device of claim 14, wherein the authentication module comprises a light, a speaker, and/or a display.

20. The wearable authentication device of claim 14, wherein the docking mechanism is configured to receive a smart card form factor payment instrument.

\* \* \* \* \*